(12) United States Patent
Schleuder et al.

(10) Patent No.: US 6,709,357 B2
(45) Date of Patent: Mar. 23, 2004

(54) TRANSFER CASE WITH TUBULAR OUTPUT SHAFT

(75) Inventors: Carl D. Schleuder, Novi, MI (US); Philip J. Francis, Lapeer, MI (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 10/091,793

(22) Filed: Mar. 6, 2002

(65) Prior Publication Data

US 2002/0134182 A1 Sep. 26, 2002

Related U.S. Application Data

(60) Provisional application No. 60/278,140, filed on Mar. 23, 2001.

(51) Int. Cl.[7] .......................... F16H 48/20; F16H 57/02
(52) U.S. Cl. ...................................... 475/223; 74/606 R
(58) Field of Search ............................. 74/606 R, 607; 475/198, 210, 213, 223, 320; 180/247, 248, 249, 250

(56) References Cited

U.S. PATENT DOCUMENTS

| | | | |
|---|---|---|---|
| 5,088,346 A | * | 2/1992 | Hirabayashi et al. ..... 74/606 R |
| 5,271,479 A | * | 12/1993 | Kuwahara et al. ...... 475/239 X |
| 5,275,253 A | * | 1/1994 | Sperduti et al. ........ 180/248 X |
| 5,286,238 A | * | 2/1994 | Shimizu et al. ......... 475/223 X |
| 5,704,868 A | * | 1/1998 | Lindsey et al. ........... 74/606 R |
| 5,738,604 A | * | 4/1998 | Dick .......................... 475/206 |
| 6,029,532 A | * | 2/2000 | Phillips .................... 74/606 R |
| 6,283,890 B1 | * | 9/2001 | Schleuder et al. ........ 74/606 R |

FOREIGN PATENT DOCUMENTS

JP            407186751    *   7/1995

* cited by examiner

*Primary Examiner*—Roger Pang
(74) *Attorney, Agent, or Firm*—Harness, Dickey & Pierce, P.L.C.

(57) ABSTRACT

A light-weight transfer case is provided for implementation with a four-wheel drive vehicle. The light-weight transfer case includes a single-piece housing formed through either a lost-foam magnesium or die cast process. First and second output shafts are included which are formed from single-piece tubing through either a hydro-forming or swaging process. The first and second output shafts are lighter weight and maintain increased strength over traditional transfer case output shafts. A gear reduction unit is also included for establishing high, low and neutral speeds of the first and second output shafts. Furthermore, a mode selection device is included for selectively providing drive to either a single output shaft, in a two-wheel drive mode, or both the first and second output shafts, in a four-wheel drive mode.

21 Claims, 4 Drawing Sheets

TRANSFER CASE WITH TUBULAR OUTPUT SHAFT

CROSS-REFERENCE TO RELATED APPLICATIONS

This application claims the benefit of U.S. Provisional Application No. 60/278,140, filed Mar. 23, 2001.

FIELD OF THE INVENTION

The present invention relates generally to transfer cases for use in four wheel drive vehicles. More particularly, the present invention is directed to a light-weight transfer case improving overall vehicle cost and efficiency.

BACKGROUND OF THE INVENTION

As is known, the majority of four-wheel drive vehicles are equipped with a transfer case mounted to a multi-speed transmission for directing power from the engine to all four wheels. To accommodate different road surfaces and conditions, many transfer cases are equipped with a mode shift mechanism which permits the vehicle operator to selectively couple the non-driven wheels to the driven wheels for establishing a part-time four wheel drive mode in addition to the two-wheel drive mode. As an alternative, some transfer cases are equipped with a transfer clutch that is passively or actively controlled in response to driveline slip for automatically delivering drive torque to the non-driven wheels for establishing an on-demand four-wheel drive mode. In addition, some transfer cases are also equipped with a two-speed range shift mechanism for permitting the vehicle operator to select between high-range and low-range four-wheel drive modes.

Automobile manufacturers continuously strive to reduce vehicle weight and improve vehicle noise, vibration and harshness (NVH) characteristics. In particular, sport utility vehicles (SUV) enjoy a significant portion of the overall vehicle market. The majority of these SUV's provide a four-wheel drive mode and, therefore, are typically equipped with a transfer case. As part of the vehicle's driveline, a transfer case has significant influence on the NVH characteristics of the vehicle. For example, vibrations and excitations generated by the transmission are transferred through the transfer case to front and rear propshafts. Additionally, the transfer case itself can be a source of NVH excitation.

On critical characteristic of four-wheel drive vehicles is the weight of the transfer case. Specifically, the shafts used in transfer cases are generally manufactured from solid forgings which are machined to form various gear segments, bearing and stop surfaces, as well as other features along the length of the shaft. Furthermore, traditional transfer cases include a multi-piece cast housing which includes at least two housing sections that are bolted together for enclosing and supporting the internal components. Because the housing sections are bolted together, each section requires a peripheral flange through which the bolts extend. In view of the recognized needs to reduce vehicle weight for improved fuel economy and to improve vehicle NVH characteristics, it is desirable to develop a light-weight transfer case providing improved NVH characteristics.

SUMMARY OF THE INVENTION

The present invention is directed to a transfer case for use in a four-wheel drive vehicle having improved weight and NVH characteristics. These improvements are provided by transfer case having tubular shafts and a one-piece housing enclosed with end plates. To this end the transfer case of the present invention includes a one-piece housing defining first and second apertures and an opening, a first cover plate enclosing the first aperture of the housing and defining an opening, and a second cover plate enclosing the second aperture of said housing and defining an opening. The transfer case also includes an input shaft extending through and rotatably supported in tje opening in the first cover plate, a first output shaft driven by the input shaft and extending through and rotatably supported in the opening in the housing, a second output shaft extending through and rotatably supported in the opening in said second cover plate, and a mode clutch for transferring drive torque from the first output shaft to the second output shaft.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENTS

The present invention relates generally to light-weight transfer cases for use in four-wheel drive vehicles for providing drive torque and rotational motion to front and rear drivelines. In particular, the light-weight transfer case comprises components having reduced weight but which retain required strength and stiffness properties. These light-weight components include a one-piece housing and tubular front and rear output shafts. Additionally, as a result of the forming process used to manufacture the tubular output shafts, each can be tuned to reduce the noise, vibration, and harshness (NVH) characteristics of the transfer case.

Figure 1:
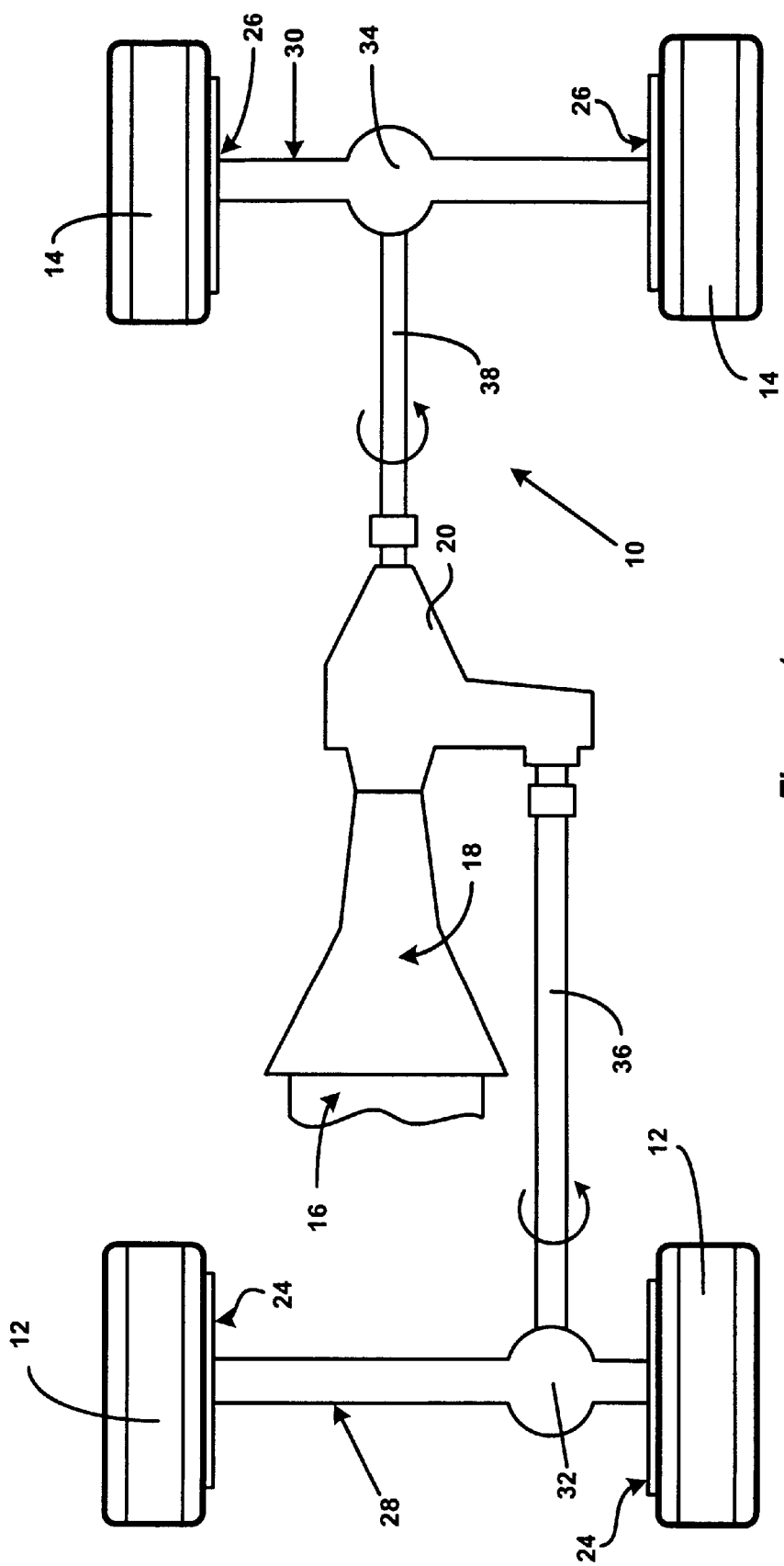
FIG. 1 is a schematic representation of a drivetrain for a four-wheel drive vehicle equipped with a light-weight transfer case according to the present invention.

With reference to FIG. 1, an exemplary motor vehicle drivetrain 10 of a type suitable for use with the present invention is schematically shown. Drivetrain 10 has a pair of front wheels 12 and a pair of rear wheels 14 drivable from a source of power, such as an engine 16 through a transmission 18. It is foreseen that transmission 18 may be either of the automatic or manual types commonly known in the art. In the particular embodiment shown, drivetrain 10 is a rear wheel drive system which incorporates a light-weight transfer case 20 that is operable to receive drive torque from transmission 18 for normally driving rear wheels 14 in a two-wheel drive mode of operation. Additionally, light-weight transfer case 20 is adapted to permit a vehicle operator to selectively transfer drive torque to front wheels 12 for defining a four-wheel drive mode of operation.

Typically, front and rear wheels 12, 14 have a common rolling radius and are part of front and rear wheel assemblies 24, 26 which, in turn, are connected at opposite ends of front and rear wheel axle assemblies 28, 30, respectively. A front differential 32 is mechanically coupled between front axle assembly 28 and a front prop shaft 36 such that front wheel assemblies 24 are driven by front prop shaft 36 when light-weight transfer case 20 is operating in the four-wheel drive mode. Similarly, rear axle assembly 30 includes a rear differential 34 coupled in driven relationship to a rear prop shaft 38 for driving rear wheel assemblies 26. It is to be understood that the orientation of drivetrain 10 is merely exemplary in nature and that the drivetrain could be reversed for normally driving the front wheels 12 in the two wheel drive mode.

Figure 2:
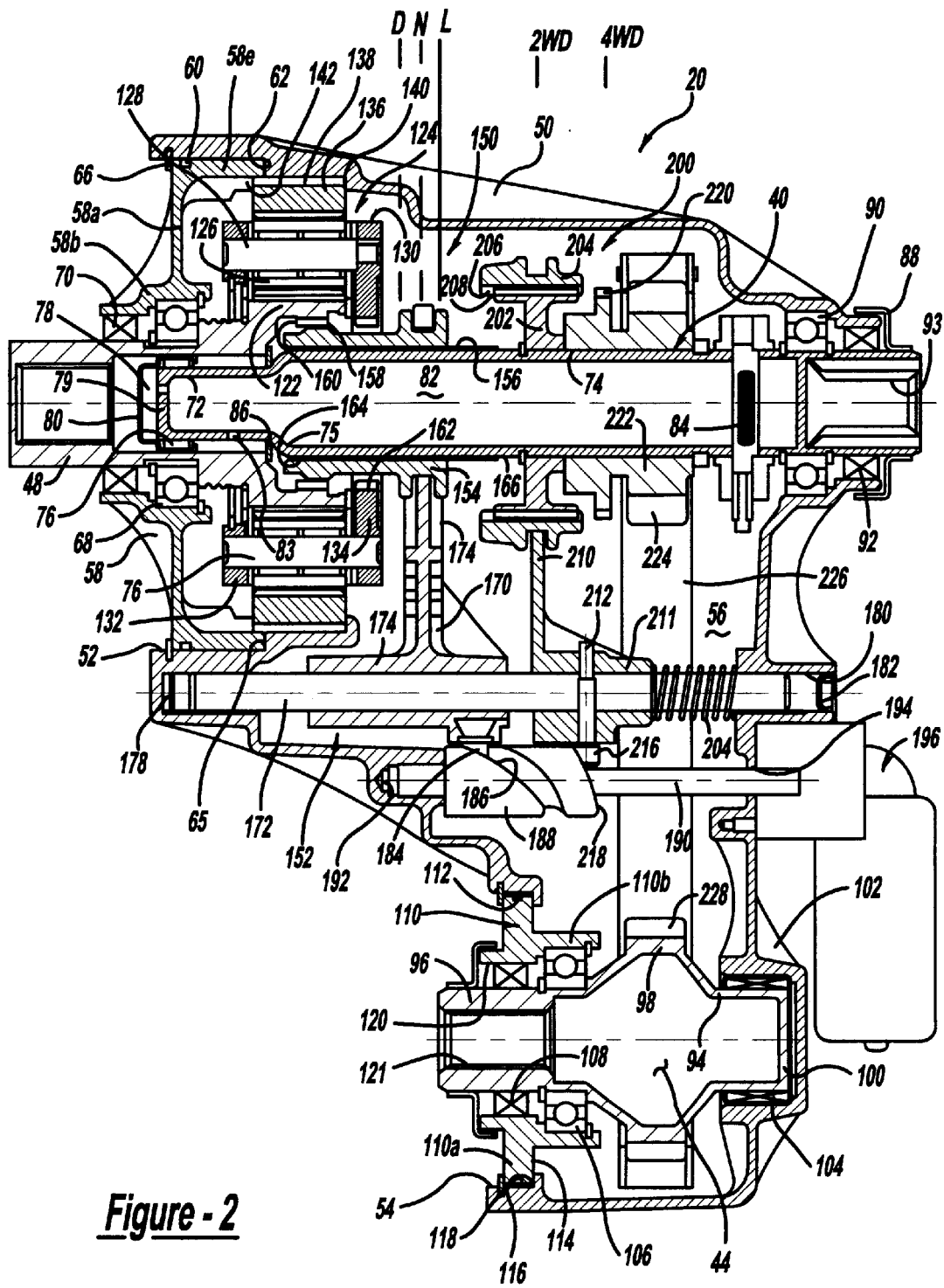
FIG. 2 is a sectional view of the light-weight transfer case of the present invention.

With reference now to FIGS. 1 and 2 rear prop shaft 38 is adapted to be connected to a rear output shaft 40 of light-weight transfer case 2o via a suitable rear coupling 42. Similarly, front prop shaft 36 is adapted to be connected to a front output shaft 44 via a suitable front coupling 46. A transmission output shaft (not shown) couples transmission 18 to an input shaft 48 of light-weight transfer case 20 for supplying power thereto. Transfer case 20 is shown to include a one-piece housing 50. Housing 50 is preferably cast from aluminum or magnesium utilizing a lost foam casting process. Housing 50 includes a first aperture 52 and a second aperture 54, each sized to permit assembly of various components into an internal chamber 56. As described hereinbelow, input shaft 48 and rear output shaft 40 rotatably support various components within chamber 56 and are themselves rotatably supported at one end by housing 50 and at an opposite end by a first cover plate 58 which encloses first aperture 52 of housing 50.

First cover plate 58 includes a plate segment 58a interconnecting an inner annular hub 58b and an outer annular hub 58c. Outer hub 58c of cover plate 58 is seated in first aperture 52 and includes a ring seal 60. As seen, a stop face 62 of outer hub 58c abuts a radial shoulder 64 formed in first aperture 52. First cover plate 58 is held in position with stop face 62 against shoulder 64 by a circlip 66. A bearing assembly 68 is retained between inner hub 58b of first cover plate 58 and input shaft 48 to facilitate rotation of input shaft 48 relative to housing 50. A seal assembly 70 provides a fluid-tight rotary seal between input shaft 48 and first cover plate 58.

Rear output shaft 40 is a tubular component aligned on the longitudinal axis of input shaft 48 and has a small diameter pilot segment 72 and a large diameter shaft segment 74. Rear output shaft 40 is preferably made using a swaging process with a tubular member having the diameter of shaft segment 74 drawn or elongated at one end to form pilot segment 72 and a tapered transition segment 75 therebetween. Pilot segment 72 is rotatably supported by a bearing assembly 76 in an axial bore 78 of input shaft 48. An end plate 79 encloses the terminal end of pilot segment 72. A seal cap 80 provides a seal between bore 78 of input shaft 48 and an internal chamber 82 of rear output shaft 40. Throughbores 83 in end plate 79 and pilot segment 72 permit hydraulic fluid in chamber 82 to lubricate various rotary components through which lubricant flows. Hydraulic fluid is supplied to chamber 82 from a shaft-driven pump 84 which draws fluid from a sump provided with chamber 56 of housing 50.

The axial position of pilot segment 72 of rear output shaft 40 is maintained relative to input shaft 48 via a thrust washer 86 which accommodates relative rotation therebetween. The opposite end of rear output shaft 40 is shown with end portion of shaft segment 74 extending through a first cylindrical opening 88 formed in housing 50 and rotatably supported therein by a bearing assembly 90. A rotary seal assembly 92 is also shown to extend between shaft segment 74 of rear output shaft 40 and first opening 88. Internal splines 93 are formed (i.e., rolled) in the open end of rear output shaft 40 and are adapted to receive an externally splined component of rear coupling 42.

With continued reference to FIG. 2, front output shaft 44 is shown to be a shaped tubular component having a first end segment 94, a second end segment 96, and a central sprocket segment 98. First end segment 94 is cylindrical and is enclosed by an end wall 100. First end segment 94 is shown to be retained in a boss segment 102 of housing 50 and rotatably supported therein via a bearing assembly 104. Second end segment 96 is also cylindrical and is mounted by a bearing assembly 106 and a rotary seal assembly 108 to a second cover plate 110. Second cover plate 110 encloses second aperture 54 of housing 50. Second cover plate 110 includes a radial plate segment 110a and an annular hub segment 110b. Plate segment 110a of second cover plate 110 is seated in second aperture 54 and includes a ring seal 112. A stop face 114 on plate segment 110a abuts a shoulder surface 116 on housing 50 while a circlip 118 secures second cover plate 110 to housing 50. Second end segment 96 of front output shaft 44 extends through an opening 120 in second cover plate 110 and is adapted for connection to front prop shaft 36 via coupling 46. Specifically, second end segment 96 has internal splines 121 formed therein adapted to receive externally splined component of front coupling 46.

Input shaft 48 has an input sun gear 122 of a planetary gearset 124 formed integral therewith. Planetary gearset 124 is a speed reduction apparatus operable for defining high and low speed ratios relative to input shaft 48. It will be understood that planetary gearset assembly 124 is merely exemplary of a suitable two speed gear apparatus for use in light-weight transfer case 20. Sun gear 122 is shown meshed with a plurality of planet gears 126. Each planet gear 126 is rotatably journalled on a pin 128 supported in a planetary carrier 130. Planetary carrier 130 includes fore and aft ring members 132 and 134 secured together by bolts (not shown). Planet gears 126 also mesh with an annulus gear 136 that is non-rotatably mounted to housing 50. Specifically, annulus gear 136 is retained against rotational movement by a plurality of radially extending tabs 138 which are received in corresponding longitudinal grooves formed in housing 50. Annulus gear 136 is additionally retained against axial movement away from a stop shoulder 140 formed in housing 50 by retention lugs 142 formed on first cover plate 58

Transfer case 20 also includes a range clutch 150 and a shift mechanism 152. Range clutch 150 includes a range sleeve 154 supported via a spline connection 156 for rotation with rear output shaft 40 and axial movement thereon between three distinct positions. In the first position, denoted by a "H" position line, external clutch teeth 158 on range sleeve 154 are meshed with internal clutch teeth 160 formed on input shaft 48, thereby establishing a direct or high-range drive connection between input shaft 48 and rear output shaft 40. In a second position, denoted by a "L" position line, external clutch teeth 158 on range sleeve 154 are meshed with internal clutch teeth 162 formed on aft ring 134 of planetary carrier 130, thereby establishing a reduced or low-range drive connection between input shaft 48 and rear output shaft 40. Finally, in its third position, denoted by a "N" position line, a non-driven neutral mode is established with range sleeve 154 disconnected from both input shaft 48 and carrier 130 such that no drive torque is transferred from input shaft 48 to rear output shaft 40. Spline connection 156 includes external splines 164 that are roll formed on an external surface 166 of shaft segment 74.

Shift mechanism 152 is operable for selectively moving range sleeve 154 between its three distinct positions. Shift mechanism 152 includes a range fork 170 journalled for axial movement on a shift rail 172 and having a C-shaped fork setment 174 retained in a peripheral groove 176 formed in range sleeve 154. One end of shift rail 172 is retained in a closed cylindrical boss 178 formed in housing 50 while its opposite end is retained in a cylindrical bore 180 formed in housing 50. An end cap 182 is shown to enclose bore 180. A cam follower 184 secured to a tubular section 175 of range fork 170 is retained in the helical groove 186 of a cam 188 that is shown secured to drive shaft 190. One end of drive shaft 190 is retained in a closed boss 192 formed in housing 50 and its opposite end extends out of a bore 194 also formed in housing 50. The second end of drive shaft 190 is coupled to a geartrain of an electric motor assembly 196.

With continued reference to FIG. 2, a mode clutch 200 is provided to selectively shift light-weight transfer case 20 between a two-wheel drive mode and a four-wheel drive mode. Mode clutch 200 includes a hub member 202 that is splined to rear output shaft 40 and an axially moveable mode sleeve 204 shown in a central disengaged or two-wheel drive mode (2WD) position. Mode sleeve 204 is formed with internal spline teeth 206 which are in constant axial sliding engagement with external spline teeth 208 on hub member 202. A mode fork 210 is coupled to mode sleeve 204 for permitting axial movement of mode sleeve 204 via selective actuation of shift mechanism 152. A tubular section 211 of mode fork 210 is secured via pin 212 to rail 172 and is biased by a spring 214 such that a cam follower 216, mounted to mode fork 210, is biased against an outer surface 218 of cam 188. Thus, mode sleeve 204 may be selectively shifted from the two-wheel drive mode (2WD) position shown to a four-wheel drive mode (4WD) position whereat internal spline teeth 206 drivingly engage external spline teeth 220 formed on a chain carrier 222. Chain carrier 222 is journalled on shaft segment 74 of rear output shaft 40 and also includes a drive sprocket 224. Drive sprocket 224 engages a chain 226, shown in dashed lines, which is coupled to a driven sprocket 228. Driven sprocket 220 is secured to or an integral portion of sprocket segment 98 of front output shaft 44. It should also be noted that front output shaft 42 is formed from tubular material similarly to rear output shaft 40, as discussed above. For example, an expandable mandrel tool may be inserted into a tubular work piece and expanded to form the shaped configuration of front output shaft 44. As such, front output shaft 44 incorporates the weight and NVH advantages resulting from the tubular forming process.

A mode selector 230 permits the vehicle operator to select any one of the available two-wheel and four-wheel high-range and low-range drive modes. A mode signal from mode selector 230 is sent to a controller 232 which sends the appropriate electric control signal to motor assembly 196 to control rotation of cam 188. As will be understood, the contour of helical cam track 186 associated with range fork 170 and the contour of cam surface 218 associated with mode fork 210 acts to coordinate movement of range sleeve 154 and mode sleeve 204 to establish the various drive modes in response to the rotated position of cam 188. As is well know, the mode clutch 200 can be replaced with a passive coupling (i.e., viscous coupling, geared traction unit, gerotor-activated clutch, etc.) or an electronically controlled active coupling (i.e., power-operated transfer clutch) as known in the art.

Figure 3A:
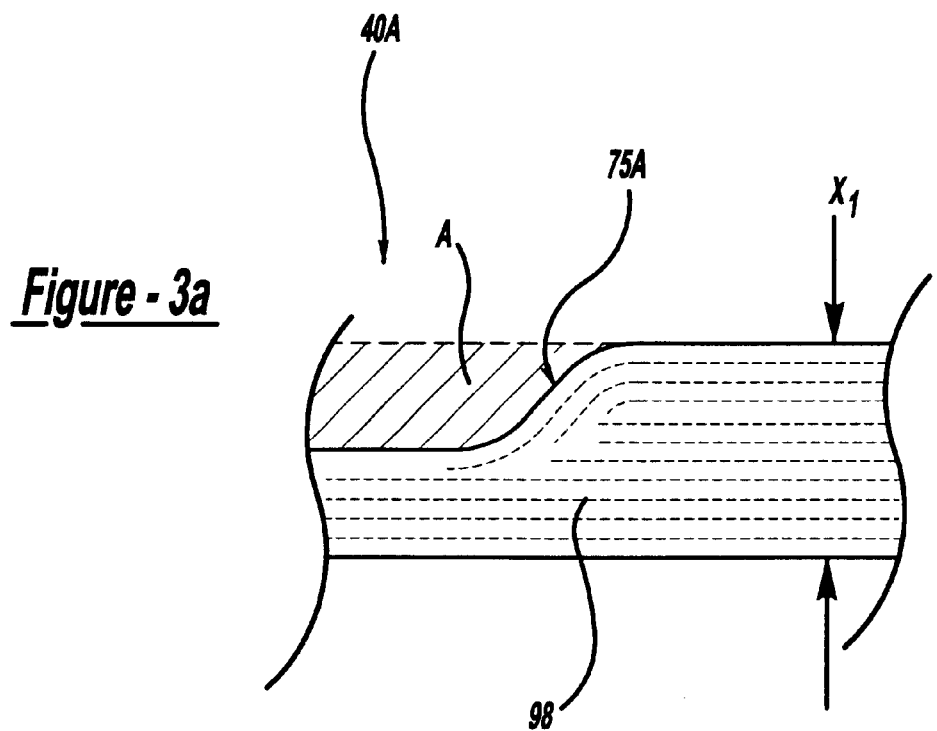
FIGS. 3A and 3B are partial sectional views of two shafts comparing grain structure according to the principles of the present invention.
Figure 3B:
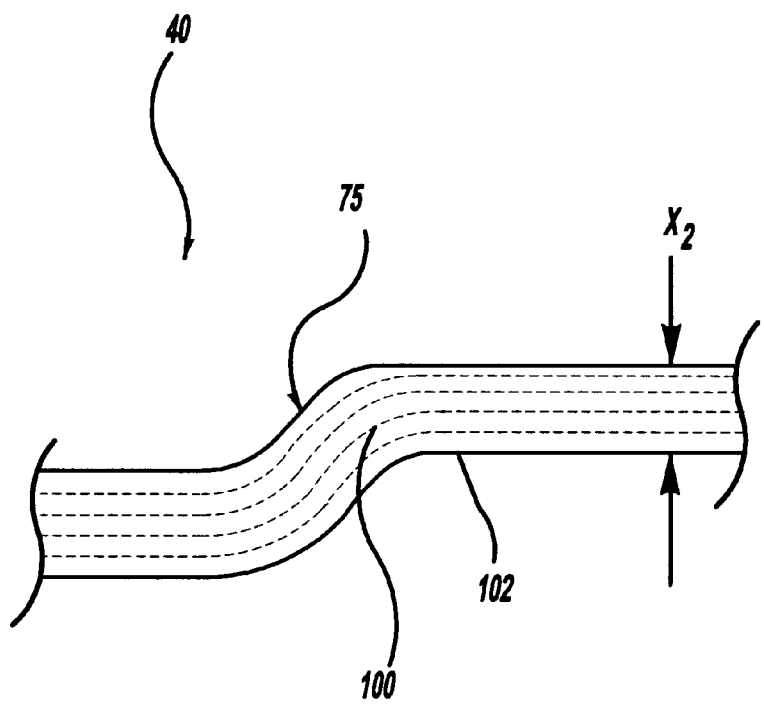

As a result of the various components which rear output shaft 40 must support and the rotatable interface between rear output shaft 40 and housing 44 and first cover plate 52, rear output shaft 40 requires various diameter changes along its length. As such, a stepped segment 75 is formed between larger diameter segment 74 and smaller diameter segment 72. Output shaft 40 is a formed tube which offers significant weight and strength advantages over traditional forged shafts. The tube can be formed through any of several forming processes known in the art. For example, hydro-forming or swaging could be used. Because the tube is formed, as opposed to turned, the metal's grain structure continuously flows along the entire length. As a result, the strength of output shaft 40 is maximized, while minimizing the amount of material required (i.e. in a cross-section a formed tube has thinner walls than an analogous turned bar shaft). With particular reference to FIGS. 3A and 3B an exemplary cross-section of each of a traditionally machined shaft 40A and a formed shaft 40 are shown, respectively. Machined shaft 40A and formed shaft 40 each include a step 75A and 75, respectively. In forming step 75A of machined shaft 40A, excess material is cut away. This material is represented by the shadowed section labeled "A". As such, the grain structure of machined shaft 40 is discontinuous at step 75. In contradistinction, the grain structure of formed shaft 40 is continuous through step 75, resulting in improved strength. Additionally, the wall thickness '$X_1$' of machined shaft 40A is much thicker than the wall thickness '$X_2$' of formed shaft 40.

Another significant advantage of formed shaft 40 is the unique ability to 'tune' it for particular excitation frequencies. Resonant frequencies through driveline components, including transfer case shafts, can result in significant NVH problems. To minimize these problems, shaft 40 can be formed to include additional steps or other features which effectively tune shaft 40 out of the excitation range. In comparison, traditional shafts require increased mass or additional dampers for curing these types of NVH problems. However, increased mass results in increased weight and dampers increase both cost and weight, as well as increasing packaging complexity within the transfer case. Obviously, the teachings relative to shaping a tubular rear output shaft 40 are also applicable to front shaft 44.

Figure 4:
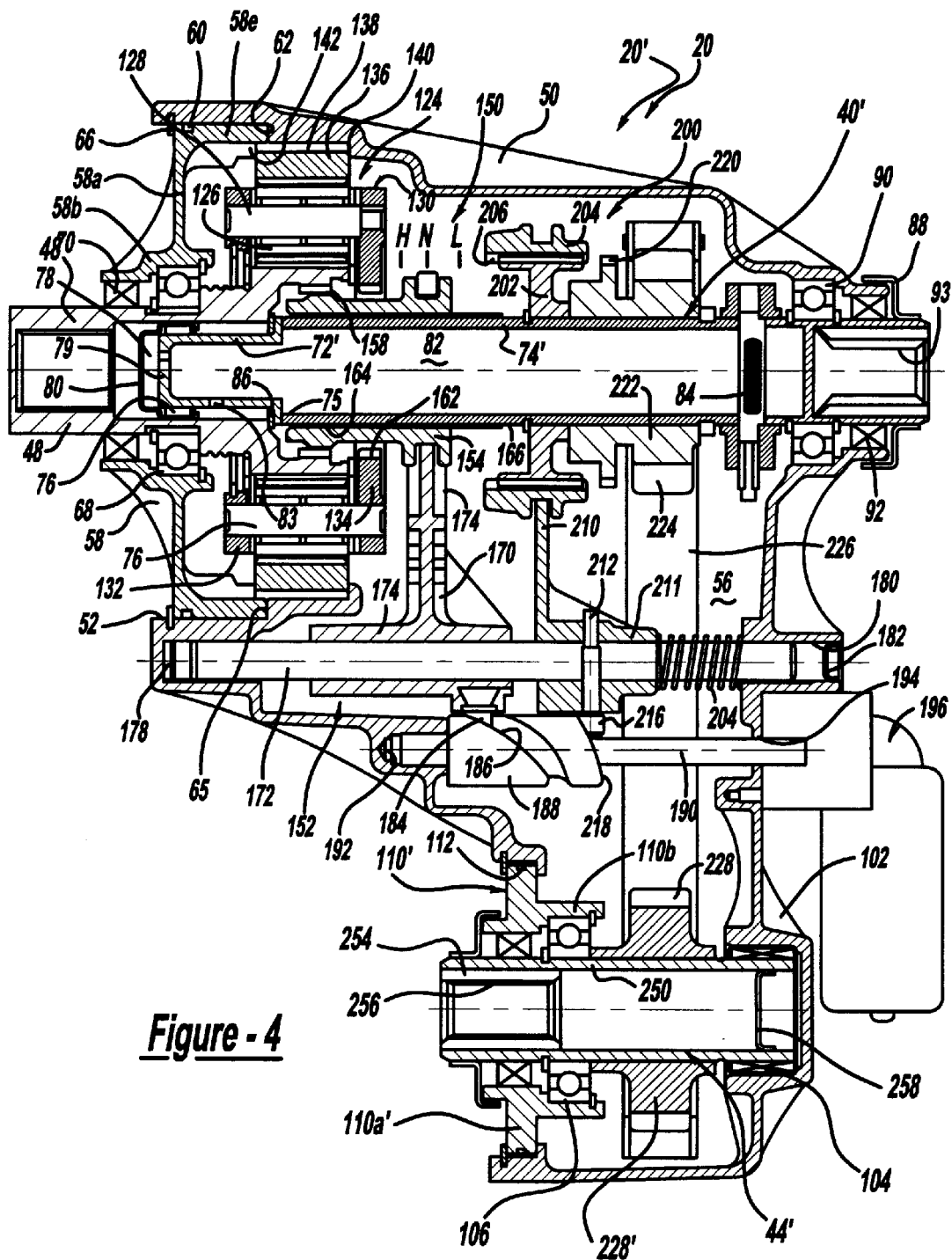
FIG. 4 is a sectional view of an alternative construction for the light-weight transfer case of the present invention.

Referring now to FIG. 4, transfer case 20' is shown to now be equipped with a modified rear output shaft, identified by reference numeral 40'. Rear output shaft 40' is a two-piece assembly having a shaft segment 74' and a pilot segment 76'. Pilot segment 76' is secured (i.e., welded) to a forward end of shaft segment 74'. This arrangement of a two-piece shaft 40' eliminates the need to perform a shaft forming operation. In addition, a modified front output shaft 44' is shown installed in transfer case 20'. As shown, front output shaft 44' has a tubular shaft segment 250 to which drive sprocket 228' is secured (i.e., welded, splined, etc.) for common rotation. Tubular shaft segment 250 has a uniform wall thickness across its length such that bearing assemblies 104 and 106 are supported thereon. Radial plate segment 110A' of second cover plate 110' has be slightly modified to accommodate retention of seal assembly 108 on shaft segment 250.

Finally, a cylindrical insert 254 is secured (i.e., welded) in the forward open end of shaft segment 250 and includes internal splines 256 adapted for meshed engagement with an externally-splined component of coupling 46. Obviously, similar splined inserts can be used in conjunction with rear output shafts 40, 40' as well. An end cap 256 is shown to enclose the rear end of shaft segment.

Those skilled in the art can now appreciate from the foregoing description that the broad teachings of the present invention can be implemented in a variety of forms. Therefore, while this invention has been described in connection with particular examples thereof, the true scope of the invention should not be limited since other modifications will become apparent to the skilled practitioner upon a study of the drawings, specification and the following claims.

What is claimed is:

1. A transfer case, comprising:
    a one-piece housing defining first and second apertures and an opening;

a first cover plate enclosing said first aperture of said housing and defining an opening;

a second cover plate enclosing said second aperture of said housing and defining an opening;

an input shaft extending through and rotatably supported in said opening in said first cover plate;

a first output shaft driven by said input shaft and extending through and rotatably supported in said opening in said housing;

a second output shaft extending through and rotatably supported in said opening in said second cover plate; and a mode clutch for transferring drive torque from said first output shaft to said second output shaft.

2. The transfer case of claim 1 wherein said first output shaft is tubular and includes a first shaft segment and a second shaft segment, said first shaft segment supported by said input shaft and said second shaft segment extending through said opening in said one-piece housing.

3. The transfer case of claim 2 wherein said first shaft segment has a smaller outer diameter than said second shaft segment.

4. The transfer case of claim 3 wherein said first output shaft is formed to include a tapered transition segment interconnecting said first shaft segment to said second shaft segment.

5. The transfer case of claim 2 further comprising:

a reduction unit having an input member driven by said input shaft and an output member driven at a reduced speed relative to said input member;

a range clutch for selectively coupling one of said input member and said output member of said reduction unit to said first output shaft; and a shift mechanism for controlling actuation of said range clutch.

6. The transfer case of claim 5 wherein said range clutch includes a range sleeve that is mounted on said second shaft segment of said first output shaft for rotation and axial movement between first and second positions, said range sleeve operable in its first position to couple said input member of said reduction unit to said first output shaft and is further operable in its second position to couple said output member of said reduction unit to said first output shaft.

7. The transfer case of claim 1 wherein said second output shaft is a tubular member having a first shaft segment rotatably supported by said housing and a second shaft segment rotatably supported by said second cover plate and extending through said opening in said second cover plate.

8. The transfer case of claim 7 wherein said second output shaft further includes a sprocket segment formed integrally between said first and second shaft segments.

9. The transfer case of claim 1 wherein said first cover plate includes a plate segment interconnecting first and second hub segments, said opening through said first cover plate extending through said first hub segment, and wherein said second hub segment is sealed against said one-piece housing.

10. The transfer case of claim 1 wherein said first output shaft comprises a formed tube defining an interior cavity and a plurality of steps along a length of said tube wherein a grain structure of said tube is generally continuous.

11. The transfer case of claim 1 wherein said second output shaft comprises a formed tube defining an interior cavity and a plurality of steps along a length of said tube wherein a grain structure of said tube is generally continuous.

12. The transfer case of claim 11 wherein said tube further defines an external sprocket.

13. A transfer case comprising:

a one-piece housing defining an aperture and a first opening;

a cover plate enclosing said aperture of said one-piece housing and defining a second opening;

an input shaft extending through said second opening in said cover plate;

a tubular output shaft driven by said input shaft and having a first tubular shaft segment supported by said input shaft and a second tubular shaft segment extending through said first opening in said one-piece housing;

a second cover plate enclosing a second aperture defined by said one-piece housing and having a third opening;

a second output shaft extending through said third opening in said second cover plate, said second output shaft is a tubular member having a first shaft segment rotatably supported by said housing and a second shaft segment rotatably supported by said second cover plate and extending through said third opening in said second cover plate; and a mode clutch for coupling said second output shaft to said first output shaft.

14. The transfer case of claim 13 wherein said first shaft segment has a smaller outer diameter than said second shaft segment.

15. The transfer case of claim 14 wherein said output shaft is formed to include a tapered transition segment interconnecting said first shaft segment to said second shaft segment.

16. The transfer case of claim 13 further comprising:

a reduction unit having an input member driven by said input shaft and an output member driven at a reduced speed relative to said input member;

a range clutch for selectively coupling one of said input member and said output member of said reduction unit to said output shaft; and a shift mechanism for controlling actuation of said range clutch.

17. The transfer case of claim 16 wherein said range clutch includes a range sleeve that is mounted on said second shaft segment of said output shaft for rotation and axial movement between first and second positions, said range sleeve operable in its first position to couple said input member of said reduction unit to said output shaft and is further operable in its second position to couple said output member of said reduction unit to said output shaft.

18. The transfer case of claim 13 wherein said second output shaft further includes a sprocket segment formed integrally between said first and second shaft segments.

19. The transfer case of claim 13 wherein said first output shaft comprises a formed tube defining an interior cavity and a plurality of steps along a length of said tube wherein a grain structure of said tube is generally continuous.

20. The transfer case of claim 13 wherein said second output shaft comprises a formed tube defining an interior cavity and a plurality of steps along a length of said tube wherein a grain structure of said tube is generally continuous.

21. The transfer case of claim 13 wherein said first cover plate includes a plate segment interconnecting first and second hub segments, said opening through said first cover plate extending through said first hub segment, and wherein said second hub segment is sealed against said one-piece housing.

* * * * *